T. A. HILL.
ROLLER FOR PARTITIONS AND DOORS.
APPLICATION FILED APR. 29, 1914.
1,328,043.
Patented Jan. 13, 1920.
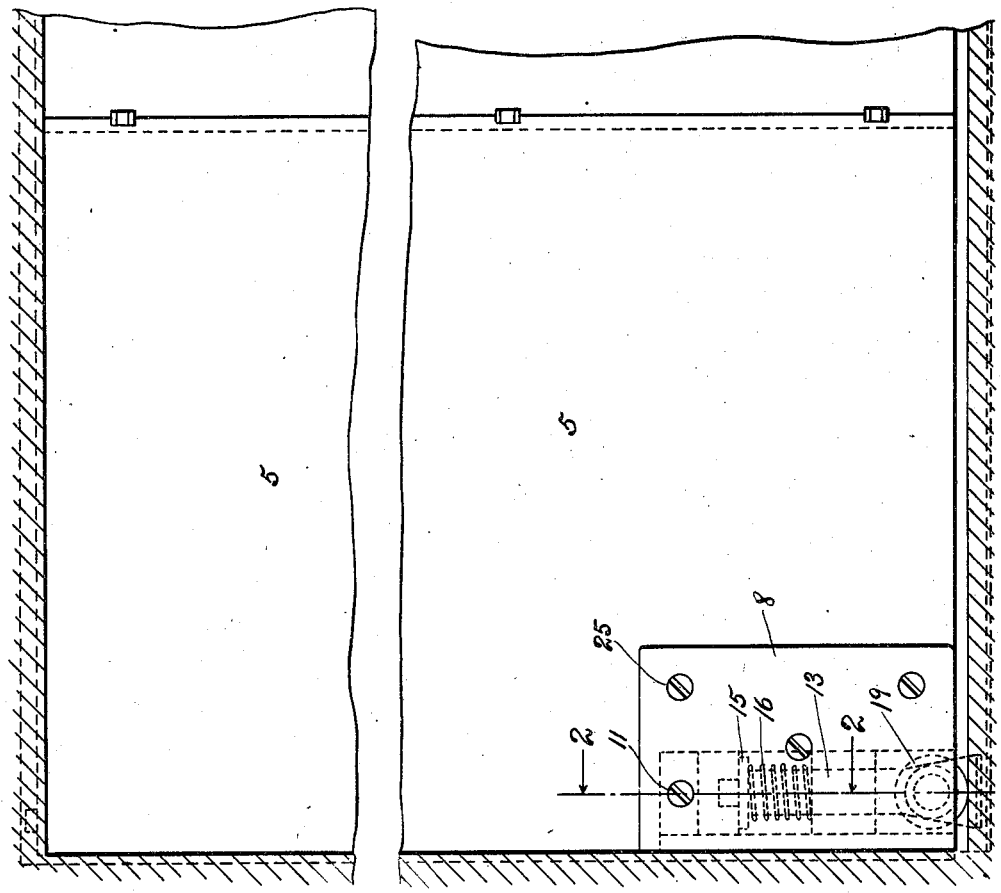

UNITED STATES PATENT OFFICE.

THOMAS A. HILL, OF BROOKLYN, NEW YORK, ASSIGNOR, BY MESNE ASSIGNMENTS, TO THE J. G. WILSON CORPORATION, A CORPORATION OF VIRGINIA.

ROLLER FOR PARTITIONS AND DOORS.

1,328,043.   Specification of Letters Patent.   Patented Jan. 13, 1920.

Application filed April 29, 1914. Serial No. 835,186.

*To all whom it may concern:*

Be it known that I, THOMAS A. HILL, a citizen of the United States, residing at the borough of Brooklyn, in the county of Kings and State of New York, have invented certain new and useful Improvements in Rollers for Partitions and Doors, of which the following is a specification, reference being had therein to the accompanying drawing.

My invention relates to improvements in rollers and bearings for folding, collapsible, or sectional walls or partitions as hereinafter more particularly set forth.

Referring to the accompanying drawings, Figure 1 illustrates in side elevation partly broken away a portion of a folding partition illustrating an application of my invention. Fig. 2 is an enlarged cross sectional detail of the roller bearing mechanism on the line 2—2 of Fig. 1.

Each section such as 5 is preferably provided at a suitable point at the base with a detachable roller bearing, the details of which are more particularly set forth in Fig. 2 in which it will be observed that the base of the section is cut away as indicated at 6, said cut away portion adapted to be closed by the side plates 7—8. 9—10 are suitable slide bearings mounted upon the slotted double screw 11 and provided with corrugations or teeth upon their lower edges adapted to engage the pyramid bearing 12. This pyramid bearing is in turn supported upon the standard 13 which terminates in the entering pin 14 and is provided with a collar or flange 15 against which is engaged the spiral spring 16, the other end of which bears upon the brackets 17 mounted between the plates 7—8. Through the lower end of the standard 13 is provided the shaft or pin 18 upon which is mounted the rollers 19 adapted to travel upon the track or plates 20—20' attached to the top of the channel 21 in the floor 22.

From this it will be seen that the slot or crack in the runway or guide upon the floor is of minimum width and is penetrated by the foot 23 having a suitable offset such as 24 which prevents the door or section from jumping out of engagement with the track. When it is found necessary to adjust the bearing the side plates may be readily removed by taking out the screw 25 so that the necessary repairs, oiling, or other attention may be given, or if it is only necessary to lengthen or shorten the bearing, this may be accomplished without removing the side plates simply by turning the screw 11 from either side of the door, thus causing the slide bearings 9—10 to approach or separate thereby projecting or withdrawing the standard 13 and its roller bearing, sufficient clearance being allowed beneath the side plates 7—8 and the floor 22 as shown.

Of course it will be readily understood that various modifications may be made without departing from the spirit of the invention as claimed.

I claim:

1. In a roller bearing of the class described a vertically adjustable standard provided with a roller bearing at the bottom, said standard terminating at the top with sides sloping in opposite directions, a fixed portion of said bearing above said standard, slide members adapted to ride between said fixed portion and said sloping sides, said slide members being internally threaded, a pin threaded oppositely at opposite ends engaging the internal threads of said slide members and adapted when turned to force said slide members together or apart thereby controlling the vertical adjustment of said standard.

2. In a roller bearing of the class described a vertically adjustable standard provided with a roller bearing at the bottom, said standard terminating at the top with sides sloping in opposite directions, a fixed portion of said bearing above said standard, slide members adapted to ride between said fixed portion and said sloping sides, said slide members being internally threaded, a pin threaded oppositely at opposite ends engaging the internal threads of said slide members and adapted when turned to force said slide members together or apart thereby controlling the vertical adjustment of said standard, a guide for said standard for keeping said sloping sides in engagement with said slide members.

3. In a roller bearing of the class described a vertically adjustable standard provided with a roller bearing at the bottom, said standard terminating at the top with sides sloping in opposite directions, a fixed portion of said bearing above said standard, slide members adapted to ride between said fixed portion and said sloping sides, said slide members being internally threaded, a pin threaded oppositely at opposite ends engaging the internal threads of said slide members and adapted when turned to force said slide members together or apart thereby controlling the vertical adjustment of said standard, a guide for said standard for keeping said sloping sides in engagement with said slide members, serrations upon said sloping sides and upon the faces of said slide members engaging therewith.

In testimony whereof I hereunto affix my signature in the presence of two witnesses.

THOMAS A. HILL.

Witnesses:
LOUISE ENDERLE,
AUG. P. JUYENSEN.